(12) United States Patent
Kim et al.

(10) Patent No.: US 10,158,319 B2
(45) Date of Patent: Dec. 18, 2018

(54) POWER SUPPLY SYSTEM

(71) Applicant: Samsung Electronics Co., Ltd., Suwon-si, Gyeonggi-do (KR)

(72) Inventors: Kyu Tae Kim, Pohang-si (KR); Byoung Chul Ko, Osan-si (KR); Sung Ki Seo, Hwaseong-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 0 days.

(21) Appl. No.: 15/416,749

(22) Filed: Jan. 26, 2017

(65) Prior Publication Data

US 2018/0019698 A1     Jan. 18, 2018

(30) Foreign Application Priority Data

Jul. 18, 2016 (KR) .................. 10-2016-0090782

(51) Int. Cl.
| | |
|---|---|
| *G05B 5/00* | (2006.01) |
| *H02H 7/08* | (2006.01) |
| *H02P 1/04* | (2006.01) |
| *H02P 29/024* | (2016.01) |
| *H02J 7/00* | (2006.01) |
| *H02P 5/74* | (2006.01) |
| *H02P 27/08* | (2006.01) |

(52) U.S. Cl.
CPC .......... *H02P 29/025* (2013.01); *H02J 7/007* (2013.01); *H02P 5/74* (2013.01); *H02P 27/08* (2013.01)

(58) Field of Classification Search
CPC ............................. H02P 29/025; H02J 7/007

USPC ......................................................... 318/476
See application file for complete search history.

(56) References Cited

U.S. PATENT DOCUMENTS

| | | | |
|---|---|---|---|
| 7,688,048 B2 | 3/2010 | Nielsen | |
| 7,786,618 B2 | 8/2010 | Cohen et al. | |
| 8,008,809 B2 | 8/2011 | Nielsen | |
| 8,164,220 B2 | 4/2012 | Cohen et al. | |
| 8,344,551 B2 | 1/2013 | Nielsen | |
| 8,552,584 B2 | 10/2013 | Cohen et al. | |
| 8,664,796 B2 | 3/2014 | Nielsen | |
| 9,093,861 B2 | 7/2015 | Nakano et al. | |
| 2009/0206668 A1* | 8/2009 | Dawes .................... | H02J 9/062 307/64 |

(Continued)

FOREIGN PATENT DOCUMENTS

| | | |
|---|---|---|
| KR | 10-0384451 B1 | 8/2003 |
| KR | 10-0732677 B1 | 6/2007 |

(Continued)

*Primary Examiner* — Erick Glass
(74) *Attorney, Agent, or Firm* — Harness, Dickey & Pierce, P.L.C.

(57) ABSTRACT

A power supply system is provided. The power supply system includes a power supply system comprises a first rectifier receiving an AC power from a first input AC power source, converting the AC power into a first DC power and outputting the first DC power to a connection node, one or more motors connected in parallel to the connection node, the motors being respectively connected to inverters converting the DC power provided from the connection node into an AC power to control the motors, and an auxiliary power source supplying a second DC power to the connection node when the supply of the first DC power is interrupted, or when an overload of the motors occurs.

18 Claims, 10 Drawing Sheets

(56) References Cited

U.S. PATENT DOCUMENTS

| | | |
|---|---|---|
| 2012/0025614 A1 | 2/2012 | Taimela et al. |
| 2013/0313894 A1* | 11/2013 | Settemsdal ............... H02J 4/00 307/9.1 |
| 2015/0176607 A1 | 6/2015 | Al-Atat et al. |
| 2016/0033978 A1 | 2/2016 | Giuntini et al. |
| 2016/0079807 A1 | 3/2016 | Nguyen |

FOREIGN PATENT DOCUMENTS

| | | |
|---|---|---|
| KR | 10-0743560 B1 | 8/2007 |
| KR | 10-0824051 B1 | 4/2008 |
| KR | 2013-0115752 A | 10/2013 |
| KR | 10-1369697 B1 | 3/2014 |
| KR | 10-1521137 B1 | 5/2015 |
| KR | 10-1603615 B1 | 3/2016 |

* cited by examiner

POWER SUPPLY SYSTEM

CROSS-REFERENCE TO RELATED APPLICATION

This application claims priority from Korean Patent Application No. 10-2016-0090782 filed on Jul. 18, 2016 in the Korean Intellectual Property Office, and all the benefits accruing therefrom under 35 U.S.C. 119, the contents of which in its entirety are herein incorporated by reference.

BACKGROUND

1. Technical Field

Example embodiments of the inventive concepts relate to a power supply system.

2. Description of the Related Art

Generally, in order to stably supply power to semiconductor production equipment for reliable and continuous operation, an uninterruptible power supply (UPS) may be installed and operated as a buffer between a commercial power supply and production equipment. The UPS may primarily generate a DC power by AC-DC converting an AC power supplied to a power system to the DC power, and output an AC power by performing DC-AC converting the DC power to AC power via an inverter.

Meanwhile, by using an inverter for motor control in semiconductor manufacturing equipment, a load supplied with AC power is used to perform AC/DC conversion and DC/AC conversion in order to change the voltage and frequency of the AC power provided by the UPS. Therefore, there may be problems such as a reduction in power conversion efficiency due to an increase in the number of power conversion steps and an increase in maintenance burden due to an increase in the number of power conversion devices.

SUMMARY

Example embodiments of the inventive concepts provide a power supply system capable of reducing the maintenance burden and increasing the power conversion efficiency by reducing the number of power conversion steps.

In some example embodiments of the inventive concepts, a power supply system may include a first rectifier configured to receive a first input AC power from a first input AC power source, to convert the first input AC power into a first DC power, and to output the first DC power to a connection node; one or more motors connected in parallel to the connection node, each of the one or more motors being connected to a respective one of one or more inverters, the one or more inverters configured to convert the DC power at the connection node into converted AC power, the one or more motors configured to receive the converted AC power; and an auxiliary power source configured to supply a second DC power to the connection node based on one or more of an interrupt in a supply of the first DC power and an overload condition of the one or more motors.

In some example embodiments of inventive concepts, a power supply system may include a first rectifier configured to receive an AC power from a first input AC power source, to convert the AC power into a first DC power, and to output the first DC power to a connection node; an auxiliary power source including a battery connected to the connection node through a chopper, the auxiliary power source configured to supply a second DC power to the connection node; one or more motors connected in parallel to the connection node through one or more inverters, respectively; and a controller configured to, determine whether to provide the first DC power and the second DC power to the connection node via the first rectifier and the chopper, respectively, and control a frequency and an output voltage of the one or more inverters.

In some example embodiments of inventive concepts, a power supply system includes a first rectifier connected to a connection node via a first switch, the first rectifier configured to perform AC-DC conversion on AC power generated by an AC power source to generate first DC power; an inverter connected to the connection node via a second switch, the inverter configured to perform DC-AC conversion on the first DC power or second DC power to generate converted AC power having one or more of a different voltage and frequency from the AC power, and to provide the converted AC power to a motor; and a controller configured to, selectively transmit the first DC power from the first rectifier to the connection node by closing the first switch, and selectively enable the inverter to convert the one or more of the first DC power and the second DC power to the converted AC power by closing the second switch.

However, example embodiments of the inventive concepts are not restricted to the one set forth herein. The above and other aspects of the example embodiments of the inventive concepts will become more apparent to one of ordinary skill in the art to which the inventive concepts pertains by referencing the detailed description of some example embodiments of the inventive concepts given below.

BRIEF DESCRIPTION OF THE DRAWINGS

The above and other aspects and features of the present inventive concept will become more apparent by describing in detail some example embodiments thereof with reference to the attached drawings, in which.

DETAILED DESCRIPTION

Figure 1:
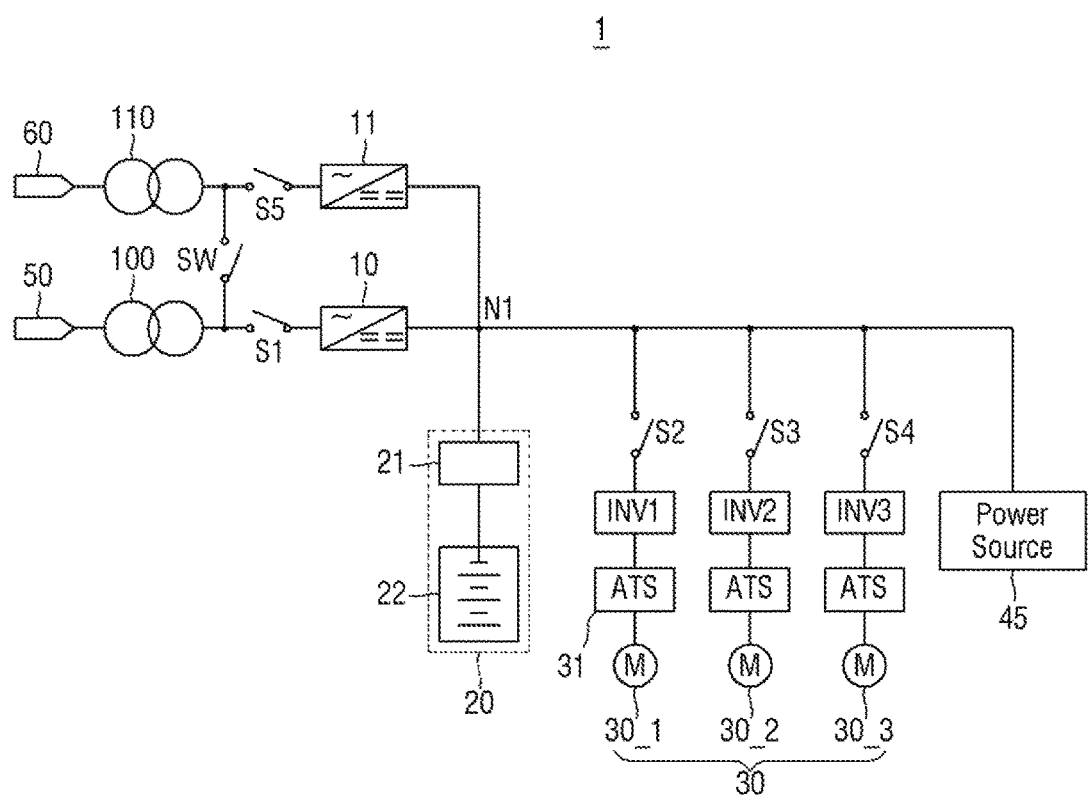
FIG. 1 is a circuit diagram illustrating a power supply system according to an example embodiment of the inventive concepts.

FIG. 1 is a circuit diagram of a power supply system according to an example embodiment of the inventive concepts.

Referring to FIG. 1, a power supply system 1 according to an example embodiment of the inventive concepts may include a first rectifier 10, a second rectifier 11, an auxiliary power source 20, one or more loads (motors) 30 connected in parallel to a connection node N1 and a power source 45.

The first rectifier 10 may convert an AC power supplied from a first input AC power source 50 into a first DC power and supply the first DC power to the connection node N1.

The first rectifier 10 may include, e.g., a pulse-width modulated (PWM) or thyristor rectifier, but the present inventive concept is not limited thereto.

A first switch S1 connected to one end of the rectifier 10 may be turned on (short-circuited) to transmit the AC power supplied from a first transformer 100 to the rectifier 10. Further, in the case of failing to provide DC power to the connection node N1 due to an abnormal operation of the rectifier 10 and/or the transformer 100, the first switch S1 may be turned off (opened) to prevent AC power from being supplied to the rectifier 10.

The auxiliary power source 20 may include a chopper 21 and a battery 22. The chopper 21 may be a DC/DC converter configured to transform a second DC power supplied from the battery 22 according to the voltage level of the connection node N1, or provide a third DC power for charging the battery 22 by transforming the voltage level of the DC power provided to the connection node N1.

The battery 22 may be connected to one end of the chopper 21 to provide power to be supplied to the motors 30. The battery 22 may include a group of battery cells containing a lithium-ion battery. In some example embodiments of the inventive concepts, the battery 22 may be included as an energy storage device in an energy storage system (ESS).

If the supply of AC power from the first input AC power source 50 is interrupted, or the supply of the first DC power to the connection node N1 is interrupted due to an abnormal operation of the first rectifier 10 or the transformer 100, the auxiliary power source 20 may supply the second DC power to the connection node N1.

Meanwhile, if all of first to third motors 30_1 to 30_3 are operated to cause an overload in the motors 30, it may be impossible to provide enough power to drive the first to third motors 30_1 to 30_3 only with the first DC power generated by the first rectifier 10. Therefore, in this case, the auxiliary power source 20 may supply the second DC power to the connection node N1. A specific operation of the auxiliary power source 20 will be described in more detail later with reference to FIGS. 2 to 5.

If the supply of the first DC power from the first rectifier 10 and the third DC power from the auxiliary power source 20 are interrupted, a switch S5 may be closed such that the second rectifier 11 may convert an AC power received from a second input AC power source 60 into a DC power and output the DC power to the connection node N1.

Further, if the first transformer 100 is operating abnormally while the first rectifier 10 is operating normally such that the first rectifier 10 can still convert AC power, a short-circuit switch SW may be switched to connect the AC power supplied from the second transformer 110 to the connection node N1.

To the connection node N1, in addition to the first rectifier 10, the second rectifier 11 and the auxiliary power source 20, one or more of the motors 30 may be connected through inverters INV1 to INV3, switches S2 to S4 and automatic transfer switches (ATS) 31. The motors 30 may include, for example, a first motor 30_1 which rotates at the first number of revolutions, a second motor 30_2 which rotates at the second number of revolutions, and a third motor 30_3 which rotates at the third number of revolutions. The first to third numbers of revolutions may be the same or different from each other.

In order to rotate the first to third motors 30_1 to 30_3 at the first to third numbers of revolutions, the first to third inverters may provide AC powers having first to third frequencies to the first to third motors 30_1 to 30_3, respectively. In other words, the first to third inverters INV1 to INV3 may convert the first or second DC power provided to the connection node N1 into AC powers having first to third frequencies by DC/AC conversion and, then, provide the AC powers having the first to third frequencies to the first to third motors 30_1 to 30_3.

Meanwhile, if the operation of the first to third motors 30_1 to 30_3 is stopped or the number of revolutions is reduced, that is, if an induced electromotive force is generated by regenerative braking, the first to third inverters INV1 to INV3 may provide a third DC power to the connection node N1 by AC/DC conversion.

Although not shown in detail, the AC power provided from the input AC power source 50 to the rectifier 10 through the transformer 100 is a three-phase AC power, and accordingly a circuit between the input AC power source 50 and the rectifier 10 may also be a three-phase circuit.

If a voltage of the DC power supplied from the inverters INV1 to INV3 falls below a reference value, the ATS 31 may automatically serve as a backup power source to supply the power of a constant voltage to the motors 30.

The power source 45 may produce and supply power to the connection node N1 separately from the power supplied from the first power source 50 and the second power source 60. For example, the power source 45 may include a new and renewable energy source such as solar or wind power.

FIGS. 2 to 6 are circuit diagrams illustrating an operation of the power supply system according to example embodiments of the inventive concepts.

Figure 2:
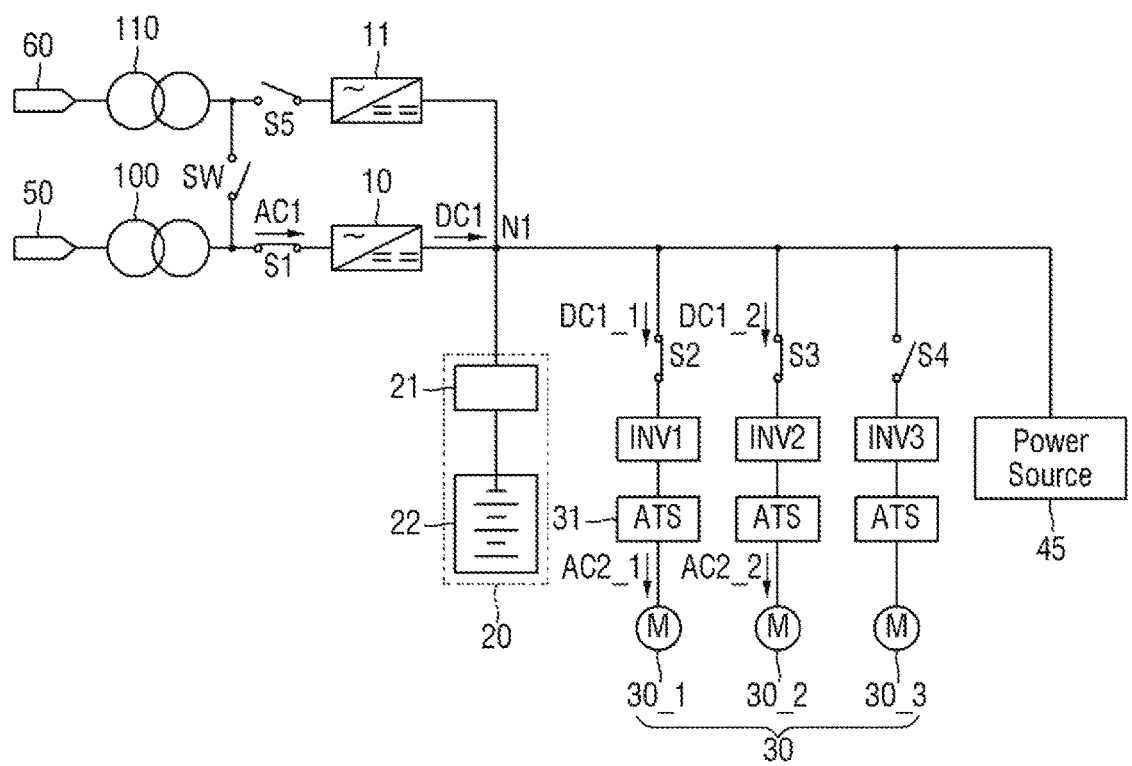
FIGS. 2 to 6 are circuit diagrams illustrating an operation of the power supply system of FIG. 1.

Referring to FIG. 2, when an abnormal condition or operation does not occur in the input AC power source 50, the transformer 100 and the rectifier 10, the switch S1 is turned on, and the AC power AC1 supplied from the input AC power source 50 and transformed by the transformer 100 is transmitted to the rectifier 10 through the switch S1. The rectifier 10 may convert the AC power AC1 into a first DC power DC1 and output the first DC power DC1 to the connection node N1.

The first DC power DC1 provided to the connection node N1 may be converted into AC power to drive the motors 30. For example, if the first and second motors 30_1 and 30_2 are required to be driven, only a second switch S2 and a third switch S3 may be turned on such that the first DC power DC1 is provided to only the first and second inverters INV1 and INV2. The first and second inverters INV1 and INV2 may convert portions DC1_1 and DC1_2 of the first DC power into AC powers AC2_1 and AC2_2, and provide the AC powers AC2_1 and AC2_2 to the first and second motors 30_1 and 30_2, respectively.

In this case, since the first DC power DC1 is provided from the rectifier 10 and an overload does not occur in the motors 30, the auxiliary power source 20 is disabled and the switch S5 is open such that the DC power provided from the auxiliary power source 20 and the second rectifier 11 to the connection node N1 is absent.

In the power supply system 1 according to an example embodiment of the inventive concepts, the AC power provided from the input AC power source 50 is AC-DC converted into the first DC power DC1 primarily by the rectifier 10. Then, the first DC power DC1 is transmitted as direct current to the connection node N1. Further, the motors 30 may receive the AC power obtained by DC-AC converting the first DC power DC provided to the connection node N1 via the inverters INV1 to INV3. Thus, AC/DC conversion and DC/AC conversion are performed only once in order to provide the AC power AC1 provided from the input AC power source 50 to the motors 30_1 and 30_2 through voltage and frequency conversion.

Accordingly, it is possible to reduce the power efficiency loss due to the AC/DC and DC/AC conversions which are repeated several times. Meanwhile, since the circuit elements can be used commonly for AC/DC and DC/AC conversions, it is possible to reduce the installation area and cost and facilitate the maintenance.

Figure 3:
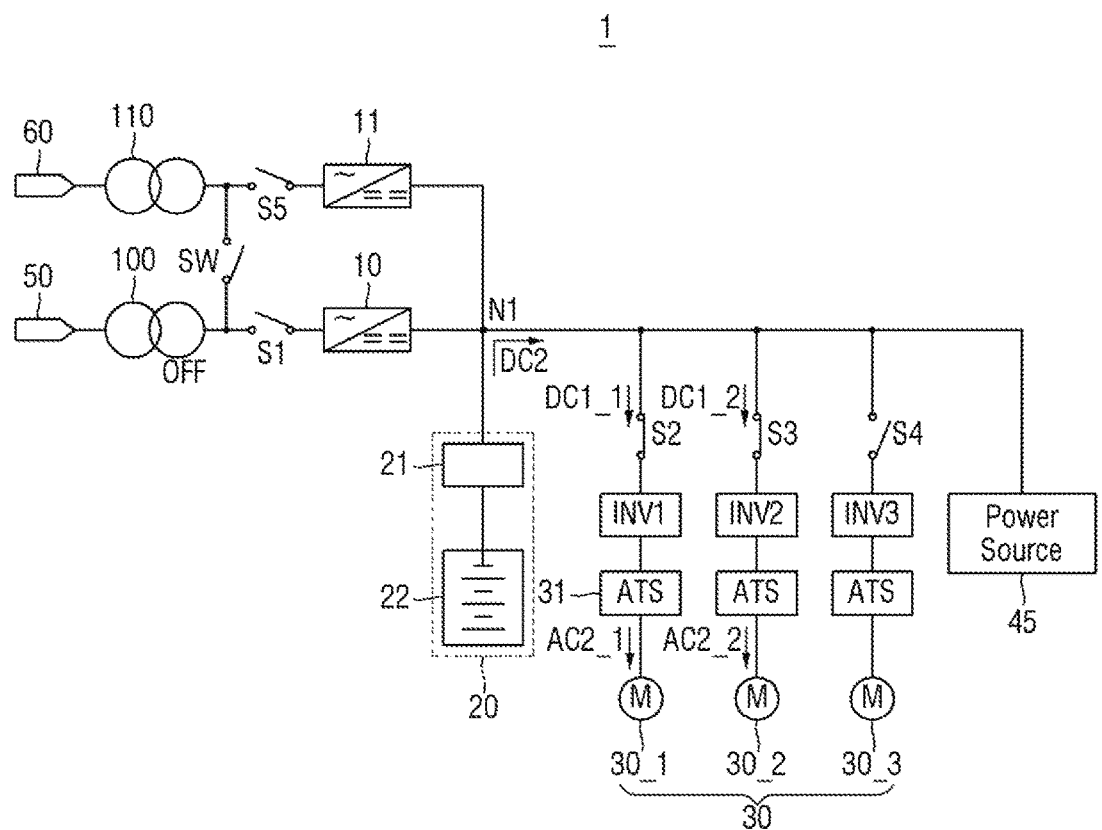

Referring to FIG. 3, the first DC power DC1 (see FIG. 2) may not be provided to the connection node N1 due to an abnormal condition or operation in the input AC power source 50, the transformer 100 and/or the rectifier 10.

Also in this case, since the motors 30 should be driven continuously, the auxiliary power source 20 is enabled such that a second DC power DC2 is provided from the auxiliary power source 20 to the connection node N1, and the first and second inverters INV1 and INV2 receive portions DC2_1 and DC2_2 of the second DC power, respectively.

Therefore, the first and second motors 30_1 and 30_2 can be driven by receiving AC powers AC2_1 and AC2_2 converted by the inverters INV1 and INV2 without interruption of power supply.

Meanwhile, the second DC power DC2 provided from the auxiliary power source 20 to the connection node N1 may be transmitted in the form of DC power to the inverters INV1 to INV3. Thus, since the DC/AC conversion is unnecessary for transmission, when the supply of the first DC power DC1 from the rectifier 10 is interrupted, the second DC power DC2 may be provided immediately to the connection node N1.

Figure 4:
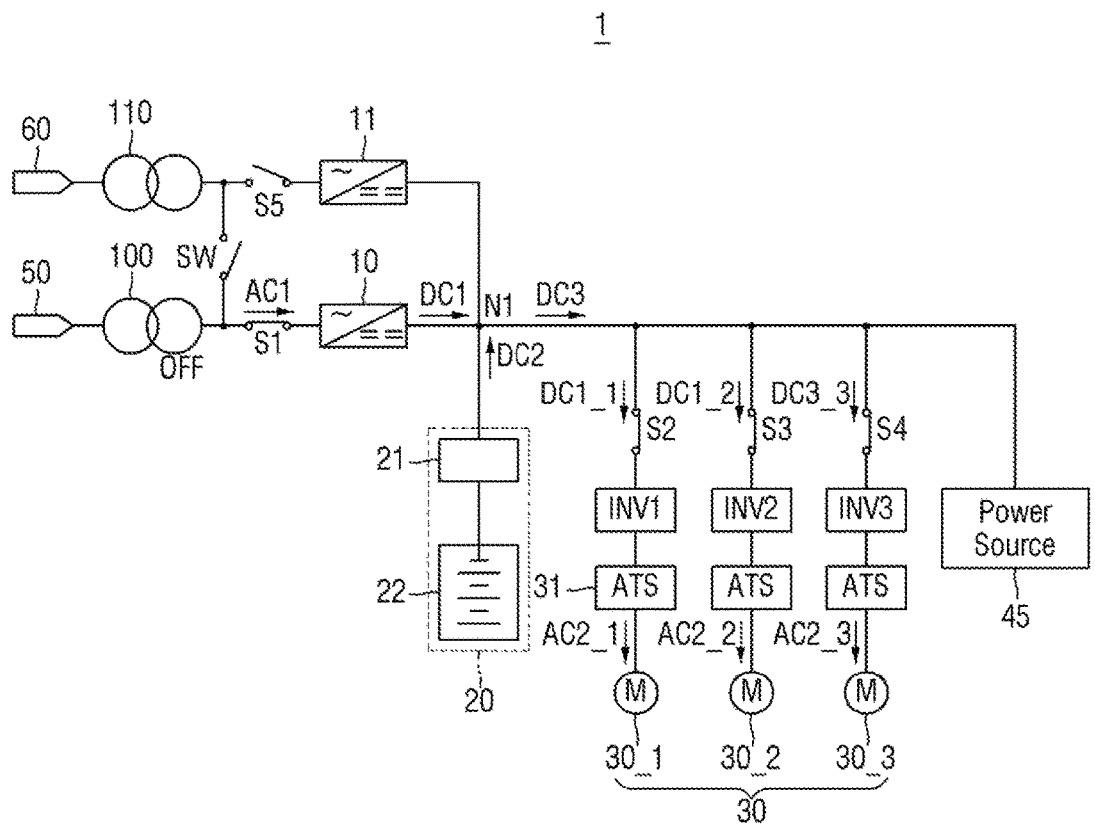

Referring to FIG. 4, while all of the first to third motors 30_1 to 30_3 are operated, an overload may occur in the motors 30. In this case, the first DC power DC1 provided by the first rectifier 10 may not be a sufficient to meet the power required by the first to third motors 30_1 to 30_3.

Therefore, in one or more example embodiments, the auxiliary power source 20 may be enabled such that the auxiliary power source 20 may provide the second DC power DC2 from the batter 22 to the connection node N1. The sum DC3 of the first DC power DC1 and the second DC power DC2 may be transmitted to the inverters INV1 to INV3, and AC powers AC2_1 to AC2_3 generated by DC/AC conversion may be transmitted to the first to third motors 30_1 to 30_3, respectively.

Also in this case, similarly, since the first DC power DC1 provided by the rectifier 10 and the second DC power DC2 provided by the auxiliary power source 20 do not need to be converted into AC power by DC/AC conversion for transmission to the inverters INV1 to INV3, it is possible to reduce the power loss due to the DC/AC conversion.

Figure 5:
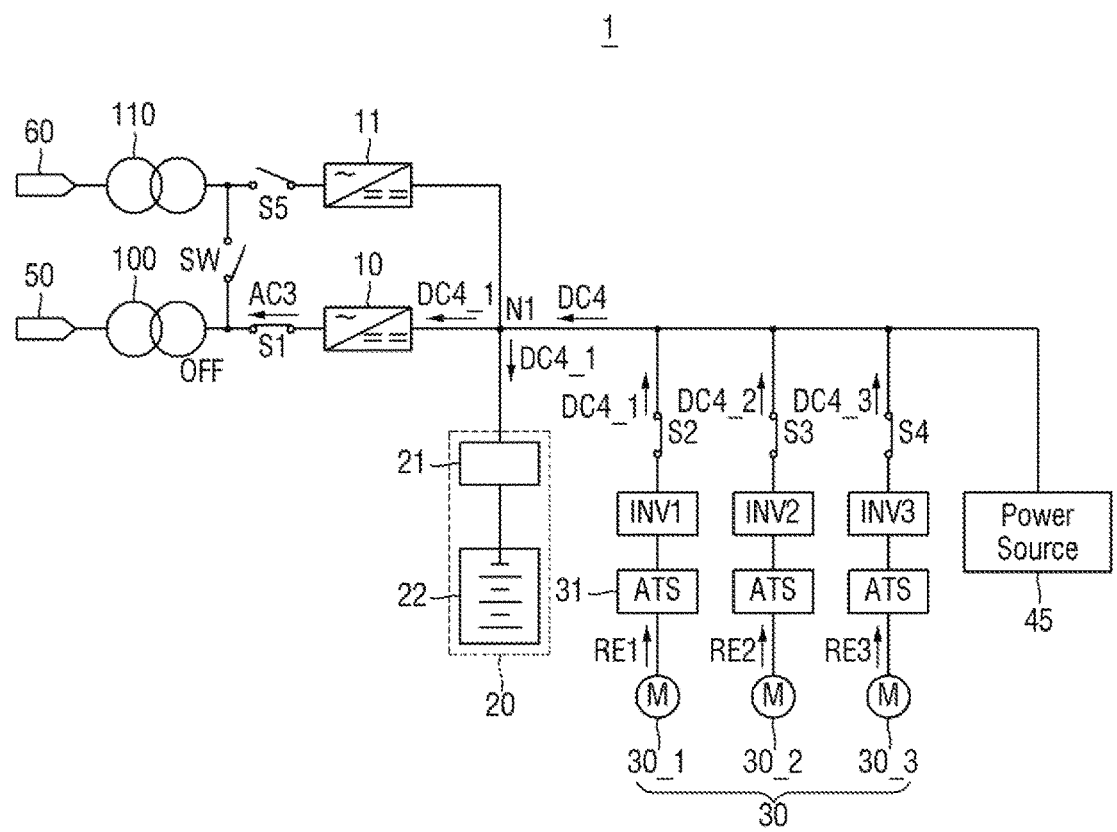

Referring to FIG. 5, an induced electromotive force generated by regenerative braking due to a reduction in the number of revolutions or an interruption of rotation of the first to third motors 30_1 to 30_3 is transmitted, as first to third regenerative braking energies RE1 to RE3, to the inverters INV1 to INV3, respectively. The first to third inverters INV1 to INV3 generate a third DC power DC4 by AC-DC converting the first to third regenerative braking energies RE1 to RE3, respectively, and provide the third DC power DC4 to the connection node N1.

The auxiliary power supply 20 may utilize the third DC power DC4 to charge the battery 22. That is, the third DC power is supplied to the chopper 21 and is stepped up or down to the charging voltage of the battery 22 to charge the battery 22.

The auxiliary power supply 20 may have priority over the rectifier 10 in regards to receiving the third DC power DC4. If the charging of the battery 20 is completed, the third DC power DC4 may be DC-AC converted via the rectifier 10 and provided as an AC power AC3 to the input AC power source 50. The AC power AC3 provided to the input AC power source 50 may be returned to the power supply system.

According to the power supply system according to an example embodiment of the inventive concepts, the regenerative braking energies RE1 to RE3 generated by the first to third motors 30_1 to 30_3 may be AC-DC converted via the inverters INV1 to INV3 and transmitted to the connection node N1 by direct current transmission. In other words, since there is no need to perform the voltage and frequency conversion for alternating current transmission of the first to third regenerative braking energies RE1 to RE3 to the connection node N1, it is possible to increase the power transmission efficiency of the energy generated by regenerative braking of the motors 30 and the charging efficiency of the battery 22.

Separately from the regenerative braking of the motors 30, the power generated from the power source 45 may be provided to the connection node N1. When the DC power generated from the power source 45 is provided to the connection node N1, the power supply system 1 may transmit the DC power to the auxiliary power source 20, or transmit the DC power to the input AC power source 50 through the first rectifier 10.

Figure 6:
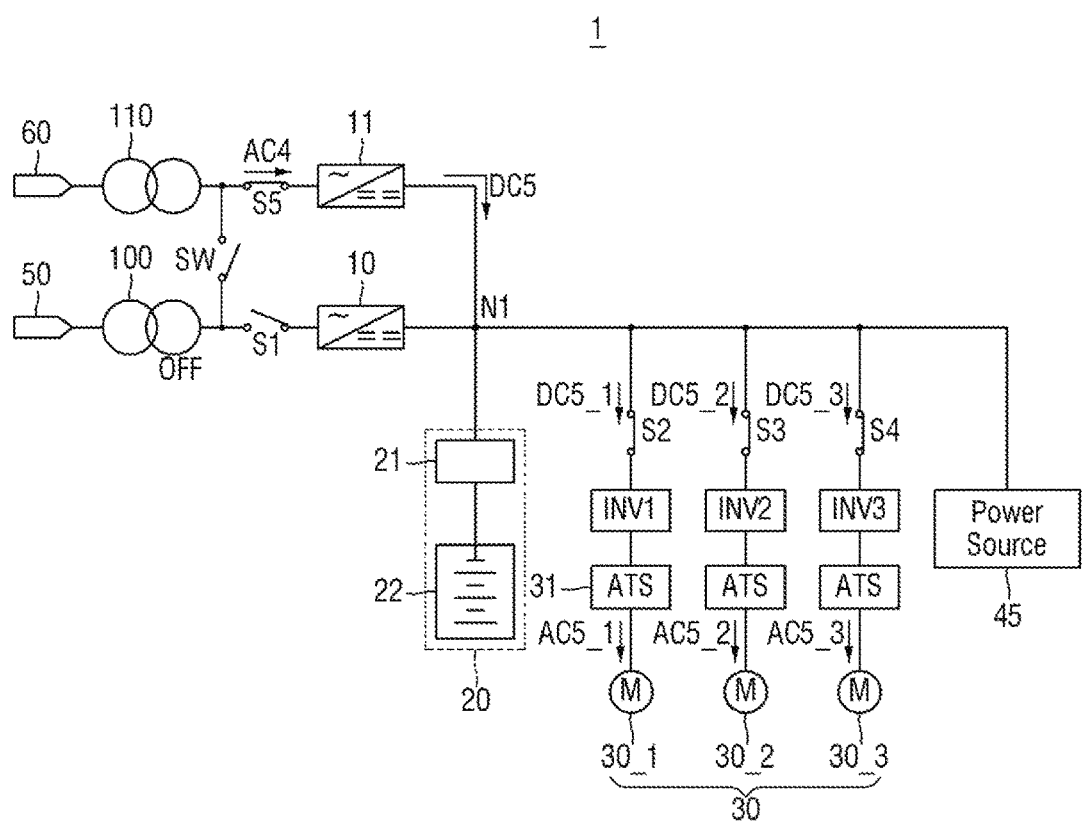

Referring to FIG. 6, if the supply of DC power from the first rectifier 10 and the auxiliary power source 20 is interrupted, the switch S5 may be closed such that the second rectifier 11 may receive an AC power AC4 from the second input AC power source 60 and output a fifth DC power DC5 to the connection node N1.

In other words, if the supply of DC power from the first rectifier 10 is interrupted, the supply of DC power from the auxiliary power source 20 is started primarily. However, the auxiliary power source 20 which outputs the charged power may fail to provide the power required to drive the motors 30 because of, for example, the capacity limit of the battery cell.

Accordingly, if the supply of DC power from the first rectifier 10 and the auxiliary power source 20 is interrupted, the switch S5 is turned on and the fifth DC power DC5 may be provided to the connection node N1 through AC/DC conversion of the second rectifier 11. Since the fifth DC power DC5 provided to the connection node N1 by the second rectifier 11 also does not need to be converted into AC power by DC/AC conversion for transmission to the inverters INV1 to INV3, it is possible to increase the power transmission efficiency.

The second rectifier 11 may include a different configuration from the first rectifier 10. That is, the second rectifier 11 may include a configuration in consideration of the characteristics of the second rectifier 11 whose driving time is shorter than that of the first rectifier 10.

Although not shown in detail, the AC power provided from the second input AC power source 60 to the second rectifier 11 through a second transformer 110 is a three-phase AC power, and accordingly a circuit between the second input AC power source 60 and the rectifier 11 may also be a three-phase circuit.

Alternatively, although not shown, the short-circuit switch SW may be used to provide the AC power from the second input AC power source 60 to the first rectifier 10 such that the first rectifier 10 provides the DC current to the connection node N1 after AC/DC conversion. In other words, if there is no problem in the operation of the first rectifier 10 although an abnormal operation occurs in the first transformer 100, the AC power supplied from the second transformer 110 may be inputted through the short-circuited switches SW and S1 and provided to the connection node N1.

Figure 7:
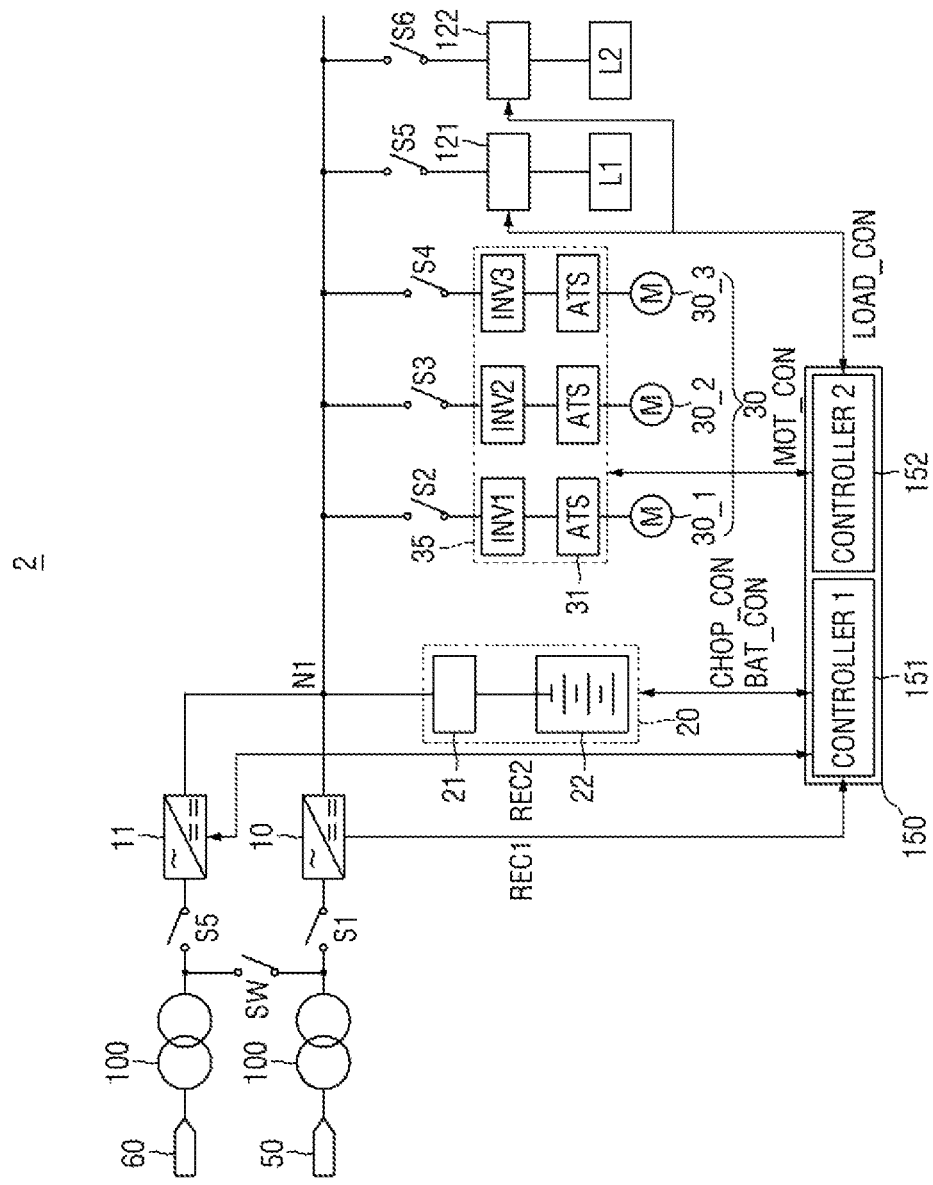
FIG. 7 is a circuit diagram of a power supply system according to another example embodiment of the inventive concepts.

FIG. 7 is a circuit diagram of a power supply system according to another example embodiment of the inventive concepts.

Referring to FIG. 7, a power supply system 2 according to another example embodiment of the inventive concepts may further include first and second loads L1 and L2 additionally connected to the connection node N1, choppers or inverters 121 and 122 for supplying DC or AC power to the first and second loads L1 and L2, first and second rectifiers 10 and 11, an auxiliary power source 20, motors 30 and a controller 150 for controlling the first and second loads L1 and L2.

The first and second loads L1 and L2 additionally connected to the connection node N1 may be electric devices which are supplied with DC or AC power. The following description will be given on the assumption that the first load L1 is supplied with AC power and the second load L2 is supplied with DC power, but example embodiments of the inventive concepts are not limited thereto.

The first load L1 may be a lighting device which is driven by being supplied with AC power. If the first load L1 is a motor, the fifth switch S5 and the inverter 121 may be connected between the first load L1 and the connection node N1. The inverter 121 may be supplied with DC power from the connection node N1, and may convert the DC power into AC power and supply the AC power to the first load L1. In this case, the frequency of the AC power supplied to the first load L1 may be different from the frequency of the power supplied to the motors 30.

The second load L2 may be, for example, an electronic device which is driven by being supplied with DC power. If the second load L2 is a computer that is driven by DC power, a sixth switch S6 and the chopper 122 may be connected between the second load L2 and the connection node N1. The chopper 122 may be supplied with DC power from the connection node N1, and may provide the DC power to the second load L2 after converting the magnitude of the DC power.

The controller 150 may include a first controller 151 for controlling the first and second rectifiers 10 and 11 and the auxiliary power source 20 which supply DC power to the connection node N1, and a second controller 152 for controlling inverters 35 which are connected to one or more motors 30 connected in parallel to the connection node N1, the inverter 121 which supplies the AC power to the first load L1 and the chopper 122 which supplies the DC power to the second load L2.

However, example embodiments are not limited thereto, for example in some example embodiments a same common controller 150 may control the entire power supply system 2.

The first controller 151 may control the first rectifier 10 by generating and transmitting a first rectifier control signal REC1. For example, the first controller 151 may monitor whether the input AC power source 50 normally supplies the AC power and whether the first transformer 100 is operated normally, and determines whether the first rectifier 10 performs an AC/DC conversion operation. That is, if the input AC power is not provided due to a problem of the input AC power source 50 or a problem of the first transformer 100, the first controller 151 may control the first rectifier 10 by instructing the first switch S1 to cut off an electric connection between the first transformer 100 and the first rectifier 10 to stop the operation of the first rectifier 10.

Meanwhile, the first controller 151 may control the auxiliary power source 20 by using a chopper control signal CHOP_CON and a battery control signal BAT_CON. For example, the first controller 151 may instruct the chopper 21 to convert the voltage charged in the battery based on the chopper control signal CHOP_CON and to provide the converted voltage to the connection node N1. Further, the first controller 151 may monitor the voltage and current levels of the battery 22 while controlling the charging and discharging of the battery and an operation of absorbing the regenerative braking energy based on the battery control signal BAT_CON.

If the AC/DC conversion operation is not performed by the first rectifier 10, the first controller 151 may instruct the auxiliary power supply 20 to provide the second DC power DC2 (see FIG. 3) from the battery 22 to the connection node N1 by using the battery control signal BAT_CON. In this case, the first controller 151 may control the chopper 21 by using the chopper control signal CHOP_CON, thereby generating the second DC power DC2 by converting the voltage of the DC power supplied from the battery 22.

Meanwhile, as a result of monitoring the level of the voltage charged in the battery 22, if the voltage level of the battery 22 falls below a desired (or, alternatively, a predetermined) level, the first controller 151 may control the second rectifier 11 and the fifth switch S5, thereby converting the second AC power from the second input AC power source 60 and providing the converted AC power to the connection node N1. At the same time, the first controller 151 may interrupt the supply of the second DC power from the auxiliary power source 20 by using the chopper control signal CHOP_CON and the battery control signal BAT_CON.

The second controller 152 may control the inverter 35 by using a motor control signal MOT_CON, and determine the frequency and the magnitude of the voltage of the AC power provided to the motors 30 by DC/AC conversion of the inverters 35. According to the motor control signal MOT_CON, the frequency and the magnitude of the voltage of the AC power provided to the motors 30 by DC/AC conversion of the inverters INV1 to INV3 may be different. Further, the second controller 152 may control the first inverter INV1 such that the first inverter INV1 outputs the AC power having a frequency r1 at a first time point and outputs the AC power having a frequency r2 at a second time point.

Meanwhile, if the operation of the first to third motors 30_1 to 30_3 is stopped or the number of revolutions is reduced, that is, if an induced electromotive force is generated by regenerative braking, the second controller 152 may control the first to third inverters INV1 to INV3 to provide the third DC power to the connection node N1 by AC/DC conversion of the AC power caused by the generated induced electromotive force.

Figure 8:
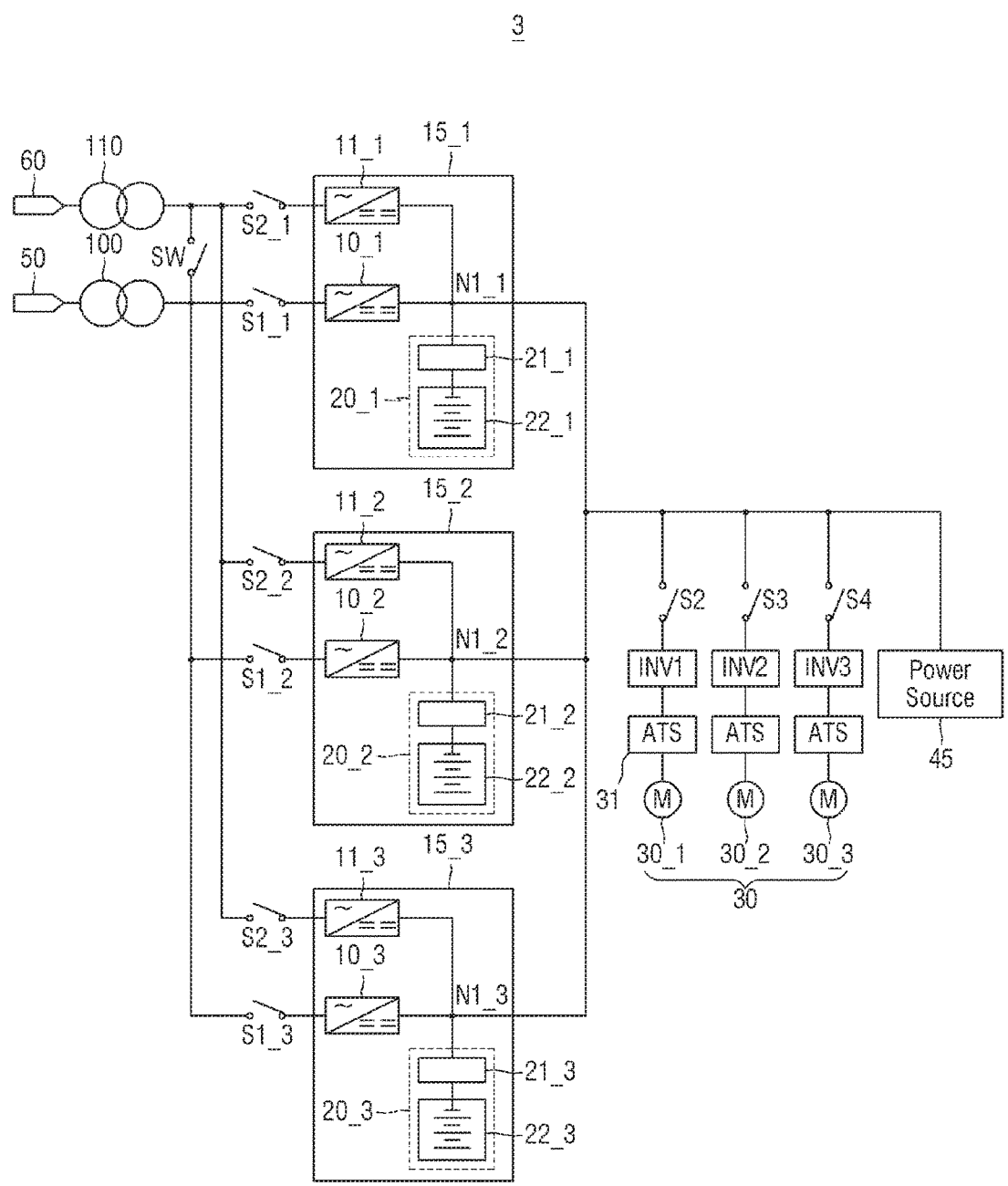
FIG. 8 is a circuit diagram of a power supply system according to still another example embodiment of the inventive concepts.

FIG. 8 is a circuit diagram of a power supply system according to still another example embodiment of the inventive concepts.

Referring to FIG. 8, a power supply system 3 according to still another embodiment of the present inventive concept may include a plurality of DC power supply systems 15_1 to 15_3.

The first to third DC power supply systems 15_1 to 15_3 may include first rectifiers 10_1 to 10_3 which are connected to the first transformer 100, and second rectifiers 11_1 to 11_3 and auxiliary power sources 20_1 to 20_3 which are connected to the second transformer 110, respectively.

The DC power supply systems 15_1 to 15_3 may supply DC powers from the first rectifiers 10_1 to 10_3, the second rectifiers 11_1 to 11_3 or the auxiliary power sources 20_1 to 20_3 to connection nodes N1_1 to N1_3, respectively.

That is, while each of the power supply systems 1 and 2 according to the above-described embodiments includes only one DC power supply system having the first rectifier 10, the second rectifier 11 and the auxiliary power source 20, in the present embodiment, the power supply system 3 may include the DC power supply systems 15_1 to 15_3 connected in parallel.

The first DC power supply system 15_1 and the second DC power supply system 15_2 may simultaneously supply DC powers to the motors 30. That is, as switches S1_1 and S1_2 are short-circuited, DC powers can be simultaneously supplied to the motors 30 from the first rectifiers 10_1 and 10_2 in the DC power supply systems connected in parallel.

In this case, the third DC power supply system 15_3 may operate differently from the other DC power supply systems 15_1 and 15_2. In other words, the third DC power supply system 15_3 may operate only when the operations of the first and second DC power supply systems 15_1 and 15_2 are stopped to supply the power to the motors 30 without operating at the same time with the first and second DC power supply systems 15_1 and 15_2.

The power supply system illustrated in FIG. 8 is merely exemplary, and the power supply system 3 may include, for example, n+1 DC power supply systems such that n DC power supply systems are operated simultaneously and the other one is operated preliminarily.

Figure 9:
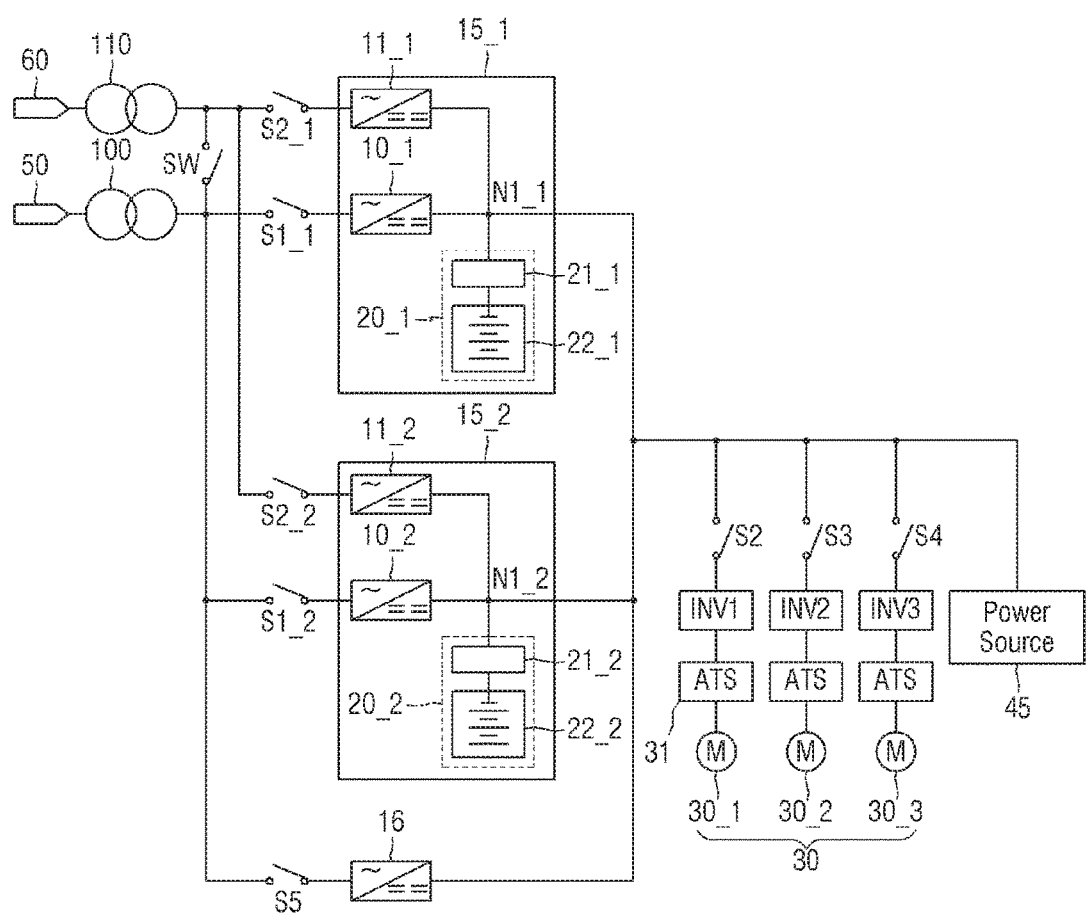
FIG. 9 is a circuit diagram of a power supply system according to still another example embodiment of the inventive concepts.

FIG. 9 is a circuit diagram of a power supply system according to still another example embodiment of the inventive concepts.

Referring to FIG. 9, a power supply system 4 according to still another embodiment of the present inventive concept may include an emergency rectifier 16 connected to the first transformer 100 in place of the third DC power supply system 15_3 included in the power supply system 3 illustrated in FIG. 8.

The emergency rectifier 16 may operate similarly to the third DC power supply system 15_3 of FIG. 8. That is, generally, the first and second DC power supply systems 15_1 and 15_2 are operated simultaneously, and the emergency rectifier 16 may not operate at the same time with the first and second DC power supply systems 15_1 and 15_2. The emergency rectifier 16 may be supplied with AC power from the input AC power source 50, only when the operations of the first and second DC power supply systems 15_1 and 15_2 are stopped, to supply the power to the motors 30.

In this respect, the emergency rectifier 16 may supply the DC power of the capacity greater than the rectifiers 10_1, 10_2, 11_1 and 11_2 included in the first and second DC power supply systems 15_1 and 15_2.

Similarly to the power supply system 3 of FIG. 8, the power supply system 4 of FIG. 9 may include two or more DC power supply systems. The power supply system 4 may be configured such that n DC power supply systems are connected in parallel to the first input AC power sources 50 and the second input AC power source 60 and the emergency rectifier 16 is connected to the input AC power source 50.

Figure 10:
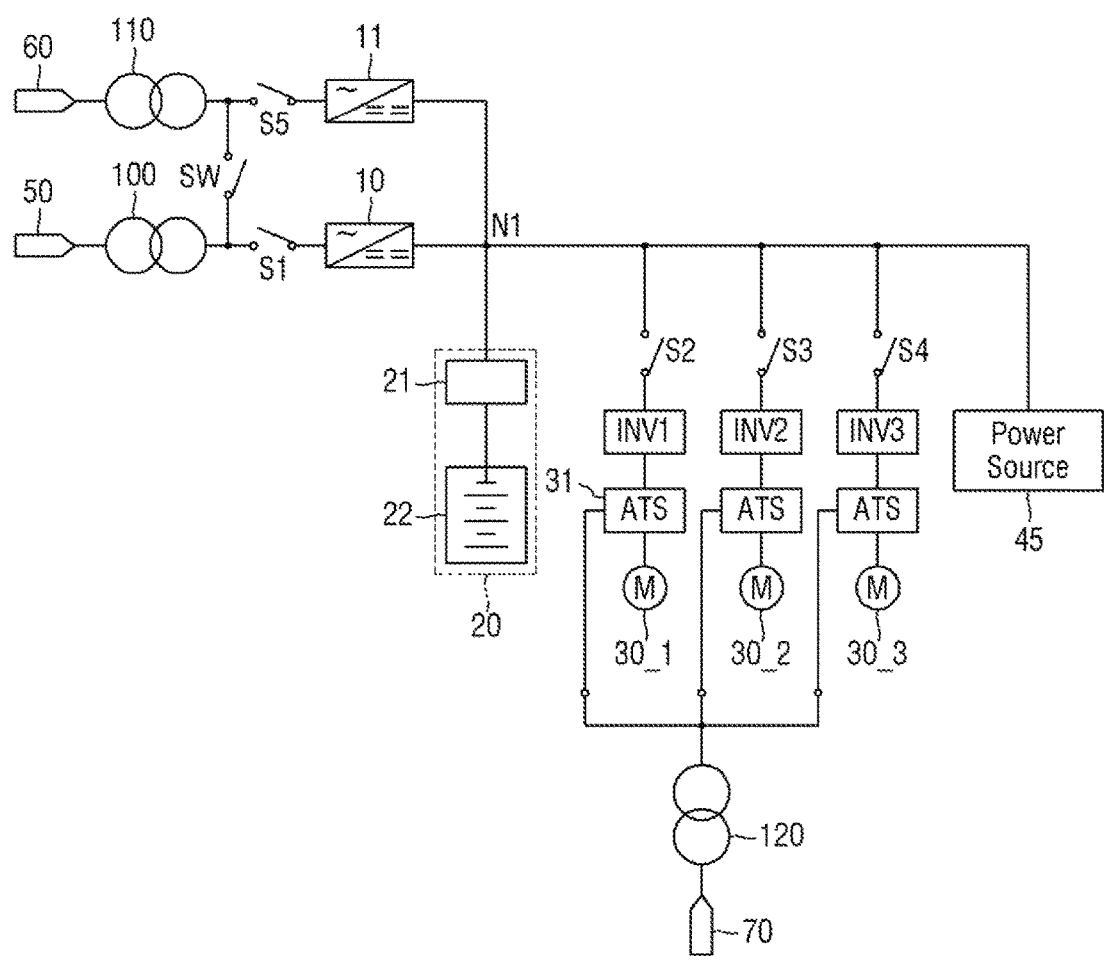
FIG. 10 is a circuit diagram of a power supply system according to still another example embodiment of the inventive concepts.

FIG. 10 is a circuit diagram of a power supply system according to still another example embodiment of the present inventive concepts.

Referring to FIG. 10, a power supply system 5 according to still another example embodiment of the inventive concepts may include a third input AC power source 70 and a third transformer 120 connected to the ATS 31.

That is, if the voltage of the AC power received from the inverters INV1 to INV3 does not reach the voltage required by the first to third motors 30_1 to 30_3 for any reason, the first to third motors 30_1 to 30_3 may not operate normally. In this case, the ATS 31 may receive power from the third input AC power source 70 serving as a backup power source and supply the power to the first to third motors 30_1 to 30_3 after cutting off the connection between the inverters INV1 to INV3 and the first to third motors 30_1 to 30_3.

Some example embodiments of the present inventive concepts have been described with reference to the attached drawings, but it may be understood by one of ordinary skill in the art that example embodiments of the inventive concepts may be performed one of ordinary skill in the art in other specific forms while keeping with the spirit of the inventive concepts. Further, the above-described example embodiments are merely examples and do not limit the scope of the rights of the inventive concepts.

What is claimed is:

1. A power supply system comprising:
   a first rectifier connected to a connection node via a first switch, the first rectifier configured to receive a first input AC power from a first input AC power source, to convert the first input AC power into a first DC power, and to selectively output the first DC power to the connection node when the first switch is closed;
   one or more motors connected in parallel to the connection node, each of the one or more motors being connected to a respective one of one or more inverters, the one or more inverters connected to the connection node via a second switch, the one or more inverters configured to selectively convert the first DC power or a second DC power at the connection node into converted AC power when the second switch is closed, the one or more motors configured to receive the converted AC power;
   an auxiliary power source configured to supply the second DC power to the connection node based on one or more of an interrupt in a supply of the first DC power and an overload condition of the one or more motors; and
   a controller configured to,
      selectively transmit a first control signal to the first switch to enable the first rectifier to supply the first DC power to the connection node, selectively transmit a second control signal to the auxiliary power source to enable the auxiliary power source to supply the second DC power to the connection node, and
      transmit a third control signal to the one or more inverters to control a frequency and an output voltage of the one or more inverters.

2. The power supply system of claim 1, wherein the auxiliary power source comprises:
   a battery configured to store the second DC power therein; and
   a chopper configured to,
      provide the first DC power from the connection node to the battery by converting a voltage of the first DC power into a target voltage, and
      output the second DC power to the connection node by converting an output voltage of the second DC power provided by the battery into an output voltage of the connection node.

3. The power supply system of claim 2, wherein the one or more inverters are configured to convert an induced electromotive force generated by regenerative braking of respective ones of the one or more motors into a third DC power, and to supply the third DC power to the connection node.

4. The power supply system of claim 3, wherein the one or more inverters are configured to,
supply the third DC power to the chopper to charge the battery, if the battery is not fully charged, and
supply the third DC power to the first rectifier, if the battery is fully charged, the first rectifier configured to supply the third DC power to the first input AC power source.

5. The power supply system of claim 1, further comprising:
a second rectifier connected to the connection node, the second rectifier configured to,
receive a second input AC power from a second input AC power source,
convert the second input AC power into a third DC power, if the supply of the first DC power and a supply of the second DC power is interrupted, and
provide the third DC power to the connection node.

6. The power supply system of claim 5, wherein the first rectifier and the second rectifier have different configurations.

7. The power supply system of claim 5, further comprising:
automatic transfer switches (ATS) connected between respective ones of the one or more inverters and the one or more motors, the ATS configured to receive third input AC power from a third input AC power source, and to supply the third input AC power to the one or more motors.

8. The power supply system of claim 1, wherein
the one or more motors include a first motor and a second motor, the first motor configured to rotate at a first number of revolutions, and the second motor configured to rotate at a second number of revolutions, the first number of revolutions being different from the second number of revolutions, and
the one or more inverters include a first inverter and a second inverter, the first inverter configured to provide the second motor with an AC power having a first frequency, and the second inverter configured to provide the second motor with an AC power having a second frequency, the first frequency being different from the second frequency.

9. The power supply system of claim 1, further comprising:
a load configured to receive a portion of the first DC power via one of the one or more inverters or a chopper connected to the connection node.

10. A power supply system comprising:
a first rectifier connected to a connection node via a first switch, the first rectifier configured to receive a first AC power from a first input AC power source, to convert the first AC power into a first DC power, and to selectively output the first DC power to the connection node when the first switch is closed;
a second rectifier connected to the connection node via a second switch, the second rectifier configured to receive a second AC power from a second input AC power source, to convert the second AC power into a third DC power, and to selectively output the third DC power to the connection node when the second switch is closed, wherein the first rectifier and the second rectifier have different configurations;
an auxiliary power source including a battery connected to the connection node through a chopper, the auxiliary power source configured to supply a second DC power to the connection node;
one or more motors connected in parallel to the connection node through a respective one of one or more third switches and a respective one of one or more inverters; and
a controller configured to,
determine which of the first DC power and the second DC power to provide to the connection node via the first rectifier and the chopper, respectively, and
control the second rectifier to provide the third DC power to the connection node, if the first rectifier is not providing the first DC power to the connection node and the auxiliary power source is not provided the second DC power to the connection node.

11. The power supply system of claim 10, wherein the controller includes a first controller connected to the first rectifier and the chopper, and a second controller connected to the one or more inverters.

12. The power supply system of claim 10, wherein
the one or more motors include a first motor and a second motor,
the one or more inverters include a first inverter connected to the first motor and a second inverter connected to the second motor, and
the controller is configured to,
control the first inverter to provide an AC power having a first frequency such that the first motor rotates at a first number of revolutions, and
control the second inverter to provide an AC power having a second frequency such that the second motor rotates at a second number of revolutions.

13. The power supply system of claim 10, wherein the controller is configured to control the one or more inverters to convert an induced electromotive force generated by regenerative braking of the one or more motors into the third DC power and to supply the third DC power to the connection node.

14. A power supply system comprising:
a first rectifier connected to a connection node via a first switch, the first rectifier configured to perform AC-DC conversion on AC power generated by an AC power source to generate first DC power;
an inverter connected to the connection node via a second switch, the inverter configured to perform DC-AC conversion on the first DC power or second DC power to generate converted AC power having one or more of a different voltage and frequency from the AC power, and to provide the converted AC power to a motor; and
a controller configured to,
selectively transmit the first DC power from the first rectifier to the connection node by closing the first switch, and
selectively enable the inverter to convert the one or more of the first DC power and the second DC power to the converted AC power by closing the second switch.

15. The power supply system of claim 14, further comprising:
an auxiliary power source including a battery and a chopper, the battery and the chopper collectively configured to generate the second DC power, wherein the controller is further configured to, determine whether to provide one or more of the first DC power and the second DC power to the connection node via the first rectifier and the chopper, respectively, transmit at least one first control signal to one or more of the first switch and the auxiliary power source based on whether the controller determines to provide one or more of the first DC power and the second DC power to the connection node, and transmit at least one second control signal to one or more of the second switch and the inverter to selectively enable the inverter to operate at the one or more of the different voltage and frequency from the AC power.

16. The power supply system of claim 15, wherein the controller is configured to determine whether to provide one or more of the first DC power and the second DC power to the connection node based on whether the AC power is sufficient to perform the AC-DC conversion.

17. The power supply system of claim 15, wherein the motor is configured to generate an induced electromotive force as a rotational speed the motor decreases, and the controller is configured to instruct, via the at least one second control signal, the inverter to convert the induced electromotive force into a third DC power and to supply the third DC power to the connection node.

18. The power supply system of claim 17, wherein the controller is configured to, instruct the auxiliary power source to recharge the battery using the third DC power, if the battery is not fully charged, and supply the third DC power to the first rectifier, if the battery is fully charged, the first rectifier configured to supply the third DC power upstream to the AC power source.

* * * * *